Aug. 23, 1932.  E. O. NICKERSON  1,873,716
PROCESS OF MAKING AND PACKAGING PIE CRUST DOUGH
Filed April 9, 1932  2 Sheets-Sheet 1
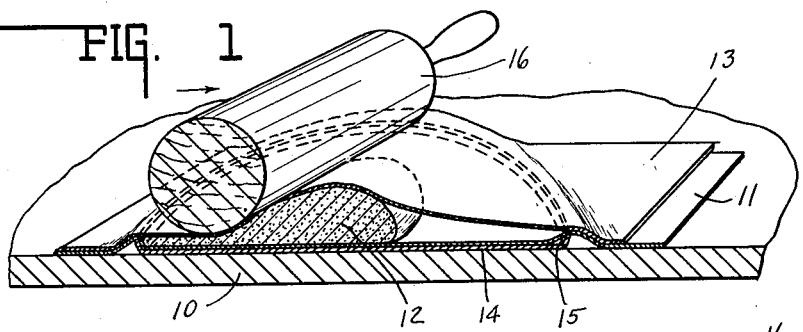
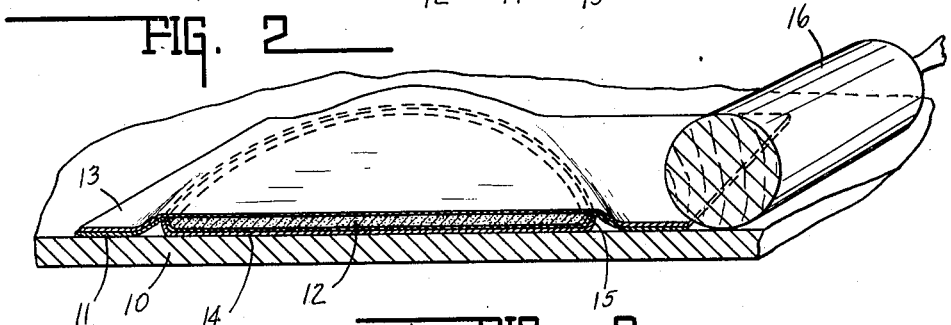
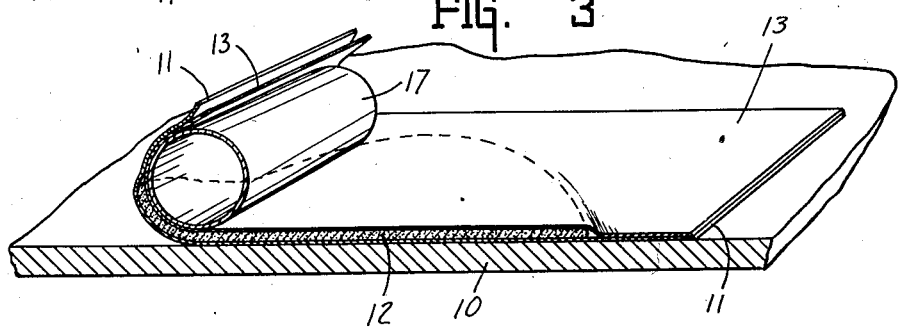
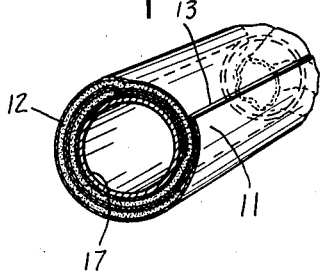
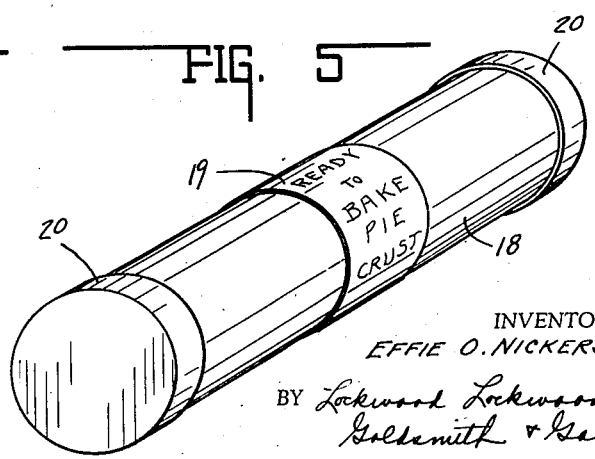
INVENTOR.
EFFIE O. NICKERSON.
ATTORNEYS.

Aug. 23, 1932.  E. O. NICKERSON  1,873,716
PROCESS OF MAKING AND PACKAGING PIE CRUST DOUGH
Filed April 9, 1932  2 Sheets-Sheet 2
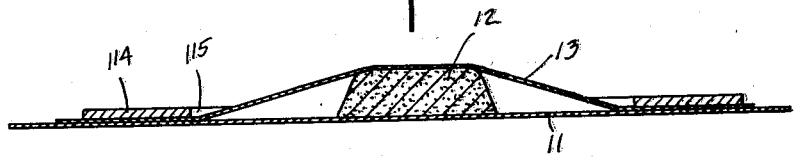
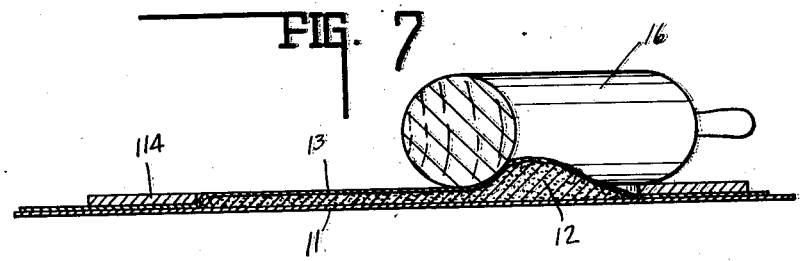
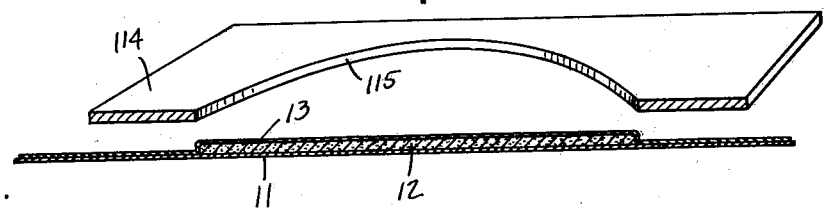
INVENTOR.
EFFIE O. NICKERSON,
BY
ATTORNEYS.

Patented Aug. 23, 1932

1,873,716

UNITED STATES PATENT OFFICE

EFFIE O. NICKERSON, OF INDIANAPOLIS, INDIANA

PROCESS OF MAKING AND PACKAGING PIE CRUST DOUGH

Application filed April 9, 1932. Serial No. 604,192.

This invention relates to the process of making pie crust dough and forming it to the desired shape after which it is packaged for commercial handling and sale.

It is the object of this invention to form pie crust dough into the desired shape and thickness for use in making pies, tarts or the like without touching it with the hands and in a manner to render it in all respects sanitary, and thereafter so mount and package it as to retain its sanitary condition and permit of ready commercial handling and sale, all at a minimum of expense.

One feature of the invention resides in forming the dough to the desired thickness and shape between two sheets of paraffin paper or the like without touching it with the hands or any utensil, such as a rolling pin, whereby it will be originally formed and thereafter maintained between sanitary protective coverings.

Another feature of the invention resides in wrapping the formed pie crust dough, while still between its original protective coverings, about a pasteboard tube or the like, and thereafter securing it about said tube to permit of convenient handling, sale and use, the dough remaining at all times protected by its original covering.

The full nature of the invention will be more clearly understood from the accompanying drawings and the following description and claims:

Fig. 1 is a longitudinal section through a perspective view showing the wad of dough placed between its protective covering preliminary to rolling the same. Fig. 2 is the same as Fig. 1 showing the dough after being rolled. Fig. 3 is a longitudinal section through a perspective view showing it being mounted upon the packaging tube. Fig. 4 is the same as Fig. 3 showing it mounted on said tube. Fig. 5 is a perspective view of the completed package ready for marketing. Figs. 6, 7 and 8 are views of modified forms of the invention showing a different type of forming element.

In the drawings there is shown a supporting table 10 upon which a lower sheet of paraffin paper or the like 11 is laid. A wad of dough 12 is laid in the center of said sheet, whereupon a second paraffin sheet 13 is mounted thereover, said sheets preferably being of a square form. Under the lowermost sheet there may be positioned a rimmed pan 14 having a slightly upstanding annular flange 15, of a diameter to form the usual 10 or 11-inch pie crust. Upon the dough being positioned between the protective paper coverings 11 and 13, a rolling pin or any suitable utensil 16 may be employed to flatten and roll the dough through the top covering 13. Thus, such utensil or the hands will not come in contact with the dough.

After the dough has been rolled into a flat annular form corresponding with the form of the pan 14 as illustrated in Fig. 2, the paper coverings are picked up with the dough therebetween, removed from the pan and wrapped about a pasteboard tube 17 without removal of the dough from the original protective coverings or otherwise touching it with the hands.

After it has been wrapped about the tube 17 as illustrated in Fig. 4, it is covered with a wrapping paper 18 and sealed with a label 19. End caps 20 may then be mounted over the tube to further hold the covering and protect the ends thereof, the laterally extending edges of the protective coverings 11 and 13 being tucked in the end of the tube, as indicated in dotted lines in Fig. 4.

The pie crust dough is thus packaged in a manner to protect it in handling.

One or more units may be wrapped in a single package. It may be preferably kept in a cold place until used, although it is recommended that it be used within several days after being made.

In use, the wrapping 18 and the ends 20 are removed from the package and the dough is unrolled with its protective coverings 11 and 13. It may then be warmed to remove any stiffness, whereby it will again be soft and pliable, after which one of its protective coverings is removed and the dough is turned upside down onto the pie pan on the pie filling with the other covering on top. Thereupon, the other covering is removed so that through the manipulation of the dough in making the pie, there is no occasion to touch it with the hands.

By means of this process of making and packaging pie dough crust, it is possible for the consumer to have a crust which is well made as distinguished from the difficulties of the average person in making good pie crust dough. Furthermore, the dough will be handled in a sanitary manner, which is not often possible in the average domestic kitchen.

By rolling the dough about a cylindrical tube, it is protected in merchandising, as well as being of a convenient shape. By reason of the thinness of the pie crust dough and the diameter thereof, as well as the fact that it becomes brittle before being heated for use, injurious effects may result from packaging and handling it in a flat or folded condition. Furthermore, by wrapping it in this manner, it is more compact and will maintain its edible condition over a longer period of time.

As illustrated in the modified forms shown in Figs. 6, 7 and 8, after the dough 12 has been placed upon the lower protective covering 11 and covered by the upper protective covering 13, a forming element 114 is provided having an annular opening 115 of the desired diameter for the pie crust. The element may be placed under or over the paper protective coverings so as to surround the dough, after which the dough is rolled or pressed so as to spread between the coverings throughout the area of the opening 115. Thus, the area and shape of the pie crust is formed by the element to the desired diameter.

The invention claimed is:

1. The process of packaging pie crust dough consisting in wrapping the formed dough about a cylindrical support, securing a cover thereabout for holding it in place and protecting it, and thereafter sealing said cover in protective position.

2. The process of packaging pie crust dough consisting in forming the dough between sheets of protective paper, wrapping the sheets with the dough therebetween about a cylindrical form, and thereafter sealing the same with an outer wrapping.

3. The process of forming and packaging pie crust dough consisting in placing the proper amount of dough upon a protective covering, placing a second protective covering thereover, thereupon applying pressure on the dough through the second covering for spreading and flattening it to the desired form, wrapping the dough while between said protective coverings about a cylindrical support and thereafter securing it in wrapped position to provide a tubular package.

4. The process of forming and packaging pie crust dough consisting in placing the proper amount of dough upon a protective sheet of waxed paper, placing a second sheet of waxed paper thereover, thereupon applying pressure on the dough through the second sheet for spreading it and flattening it to the desired form, wrapping said sheets with the dough therebetween about a pasteboard tube, and applying thereabout a wrapping for securing the package.

5. The process of forming and packaging pie crust dough consisting in placing the proper amount of dough upon a protective sheet of waxed paper, placing a second sheet of waxed paper thereover, thereupon applying pressure on the dough through the second sheet for spreading it and flattening it to the desired form, wrapping said sheets with the dough therebetween about a pasteboard tube, wrapping the same with an outer covering and sealing it in place by a pair of end caps conforming to the ends of said tube for locking thereon.

6. The process of forming and packaging pie crust dough consisting in placing the proper amount of dough upon a protective covering, placing a second protective covering thereover, surrounding the same by a forming element, said forming element having an opening of the desired shape and size, and thereafter applying pressure on the dough through the second covering for spreading and flattening it within the confines of the opening in the forming element, whereby the pie crust formed therein will be of desired shape and size.

In witness whereof, I have hereunto affixed my signature.

EFFIE O. NICKERSON.